(12) United States Patent
Quartieri et al.

(10) Patent No.: US 11,333,075 B2
(45) Date of Patent: May 17, 2022

(54) METHOD AND SYSTEM FOR SAFE GAS TURBINE STARTUP

(71) Applicant: Nuovo Pignone Tecnologie—S.r.l., Florence (IT)

(72) Inventors: Eugenio Quartieri, Florence (IT); Claudio Botarelli, Florence (IT); Nicola Vanni, Florence (IT); Daniele Bruni, Florence (IT); Andrea Carnieri, Florence (IT); Bruno Giunta, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 93 days.

(21) Appl. No.: 16/627,073

(22) PCT Filed: Jun. 29, 2018

(86) PCT No.: PCT/EP2018/067635
§ 371 (c)(1),
(2) Date: Dec. 27, 2019

(87) PCT Pub. No.: WO2019/002572
PCT Pub. Date: Jan. 3, 2019

(65) Prior Publication Data
US 2020/0141321 A1 May 7, 2020

(30) Foreign Application Priority Data
Jun. 30, 2017 (IT) .................. 102017000073686

(51) Int. Cl.
*F02C 7/232* (2006.01)
*F02C 9/26* (2006.01)
(Continued)

(52) U.S. Cl.
CPC .............. *F02C 7/232* (2013.01); *B64D 37/32* (2013.01); *F02C 9/263* (2013.01); *F01D 19/00* (2013.01);
(Continued)

(58) Field of Classification Search
CPC .. F02C 7/22; F02C 7/222; F02C 7/232; F02C 7/26; F02C 9/263; F02C 9/46;
(Continued)

(56) References Cited

U.S. PATENT DOCUMENTS 4,103,537 A * 8/1978 Victor ................. G01M 3/2807
73/40.5 R
4,417,439 A * 11/1983 Sepulveda ................ F23R 3/28
60/742
(Continued)

FOREIGN PATENT DOCUMENTS

EP 2 650 491 A2 10/2013
EP 3 171 005 A1 5/2017

OTHER PUBLICATIONS

International Search Report of the International Searching Authority for PCT/EP2018/067635 dated Sep. 5, 2018.

*Primary Examiner* — Alain Chau
(74) *Attorney, Agent, or Firm* — Baker Hughes Patent Org.

(57) ABSTRACT

A method for safe gas turbine startup is disclosed. The method comprises a first step wherein a fuel metering valve (33) arranged along a fuel delivery line is tested for possible leakages. If the leakage test is successfully passed, a subsequent turbine startup step can be performed. Further disclosed is a gas turbine engine (3) comprising a fuel supply system (20) comprised of a fuel delivery line (21) and a valve arrangement (23) positioned along said fuel delivery line (21). The valve arrangement (23) further comprises sequentially arranged shut off valves (25, 29, 31) and a fuel (Continued)

metering valve (33), positioned downstream of the shut off valves (25, 29, 31). A pressure measuring arrangement (43, 45, 47) is further provided, adapted to measure fuel pressure in at least one portion of the fuel delivery line (21) upstream of the fuel metering valve (33).

21 Claims, 8 Drawing Sheets

(51) Int. Cl.
    *B64D 37/32*    (2006.01)
    *F01D 19/00*    (2006.01)
    *F02C 3/04*     (2006.01)
    *F02C 7/236*    (2006.01)
    *F02C 7/26*     (2006.01)
    *F23R 3/28*     (2006.01)
    *F02D 41/22*    (2006.01)

(52) U.S. Cl.
    CPC ................ *F02C 3/04* (2013.01); *F02C 7/236* (2013.01); *F02C 7/26* (2013.01); *F02D 2041/225* (2013.01); *F05D 2240/35* (2013.01); *F05D 2260/83* (2013.01); *F05D 2260/85* (2013.01); *F05D 2260/96* (2013.01); *F05D 2270/301* (2013.01); *F23R 3/28* (2013.01)

(58) Field of Classification Search
    CPC ........... F02D 2041/225; F05D 2260/83; F05D 2260/85; G01M 15/14; G01M 3/26; G01M 3/2875; G01M 3/2815
    See application file for complete search history.

(56) References Cited

U.S. PATENT DOCUMENTS

| | | | | |
|---|---|---|---|---|
| 4,825,198 | A * | 4/1989 | Rolker | ................ G01M 3/2876 340/605 |
| 6,761,629 | B1 * | 7/2004 | Parker | .................... F01D 11/00 114/211 |
| 8,261,595 | B2 * | 9/2012 | Szepek | ............... G01M 3/2876 73/46 |
| 9,140,189 | B2 * | 9/2015 | Romig | ....................... F02C 7/22 |
| 9,933,327 | B2 * | 4/2018 | Faqihi | .................... G01M 3/243 |
| 10,260,425 | B2 * | 4/2019 | Crowley | ...................... F02C 9/28 |
| 10,451,509 | B2 * | 10/2019 | Mehrer | .................... F02C 7/236 |
| 10,989,620 | B2 * | 4/2021 | Saha | ..................... G01M 3/222 |
| 2004/0025492 | A1 * | 2/2004 | Griffiths | .................. F02C 9/263 60/39.281 |
| 2004/0083711 | A1 | 5/2004 | Hodinot et al. | |
| 2008/0125930 | A1 * | 5/2008 | Johnson | .................... F02C 9/42 701/9 |
| 2008/0296403 | A1 * | 12/2008 | Futa, Jr | ....................... F23K 5/06 239/95 |
| 2010/0288883 | A1 * | 11/2010 | Rivot | ....................... F02C 9/46 244/135 R |
| 2011/0100096 | A1 * | 5/2011 | Szepek | ............... G01M 3/2876 73/40.5 R |
| 2012/0048000 | A1 | 3/2012 | Kirzhner | |
| 2012/0130553 | A1 * | 5/2012 | Purani | ....................... F02C 7/26 700/287 |
| 2012/0239315 | A1 * | 9/2012 | Baker | ................ G01M 3/2876 702/51 |
| 2013/0269364 | A1 | 10/2013 | Romig et al. | |
| 2014/0094978 | A1 * | 4/2014 | Sherman | ................... F02C 9/54 700/287 |
| 2015/0308915 | A1 * | 10/2015 | Konatham | ............... G01M 3/04 60/39.091 |
| 2016/0069476 | A1 * | 3/2016 | Solacolu | ............. F16K 37/0083 137/1 |
| 2016/0091381 | A1 * | 3/2016 | Mehrer | ..................... F02C 9/46 60/39.281 |
| 2017/0052087 | A1 * | 2/2017 | Faqihi | .................... G01M 3/243 |
| 2017/0074174 | A1 * | 3/2017 | D'Alessandro | ......... F02C 7/264 |
| 2017/0114726 | A1 * | 4/2017 | Selstad | ...................... F02C 9/28 |
| 2017/0138271 | A1 | 5/2017 | Negroni et al. | |
| 2017/0321608 | A1 * | 11/2017 | Crowley | .................... F02C 7/236 |
| 2019/0094100 | A1 * | 3/2019 | Saha | ...................... G01M 3/38 |

* cited by examiner

METHOD AND SYSTEM FOR SAFE GAS TURBINE STARTUP

TECHNICAL FIELD

The present disclosure relates to gas turbine engines. Embodiments disclosed herein specifically relate to methods and systems to perform leakage tests on the shut-off valves and metering valves arranged along the fuel gas delivery line which delivers fuel gas to the combustor section of the gas turbine engines. According to aspects of the disclosure, methods and systems are disclosed, which ensure safe start-up of gas turbine engines, preventing issues potentially arising from excess fuel accumulating in the discharge plenum. Excessive fuel can derive from malfunctioning of the fuel metering valves or leakages thereof.

Background Art

Gas turbine engines are widely used as prime movers in several industrial applications. Broadly speaking, gas turbine engines are comprised of an air compression section, a combustor section and a turbine section. Air is compressed by the air compression section and is delivered to the combustor section. Fuel, either a liquid fuel or a gaseous fuel, is mixed with the compressed air in the combustor section and ignited to generate hot, pressurized combustion gas, which is expanded in the turbine section and finally exhausted through an exhausted gas stack. Power generated by the combustion gas expansion is partly used to drive the compressor(s) of the air compression section and partly made available on a output shaft, to drive a load.

Along the fuel delivery line valves are arranged, to control the amount of fuel delivered to the combustor section and to shut-off fuel delivery when the gas turbine engine shall be shut down. Shut off valves are provided to interrupt fuel delivery towards the combustor section. One or more fuel metering valves are provided, to precisely meter the amount of fuel delivered to the combustor section, based upon a turbine controller input signal, for instance.

A critical aspect in gas turbine engine start-up concerns excess fuel delivery due to malfunctioning of the metering valves and undetected leakages thereof.

Leakages of the valves may lead to hazardous situations or to an improper start-up of the gas turbine engine. A correct operation of the fuel metering valve is particularly important at turbine startup, for instance. Leakages and incorrect operation of the fuel metering valve may lead to excessive fuel and difficulties in ignition of the fuel/air mixture in the combustor section of the gas turbine engine. Unburnt fuel may accidentally explode in the exhaust gas section, e.g. if the low explosive limit is achieved.

Systems and methods have been developed to test the valve functionality prior to startup of the gas turbine, in order to check whether the shut-off valves and the fuel metering valves are operating correctly and to prevent excessive leakages to occur, such that startup of the gas turbine engine can be performed under safe conditions. A flowmeter, such as a so-called Coriolis flowmeter is usually provided along the fuel delivery line, to measure the fuel mass flow. At turbine startup leakages or incorrect position of the fuel metering valve can be detected by the flowmeter. If the flowmeter detects an excessive fuel flow, an alarm signal is generated and the turbine startup sequence is aborted.

Flowmeters are expensive and critical pieces of equipment, and shall be carefully tested and periodically calibrated to ensure correct operation. They are adversely affected by external vibrations such that accurate mounting is needed. Additionally, flowmeters are prone to generate false alarms, which may be caused by pressure fluctuations in the fuel delivery duct, due to the opening of shutoff valves along the fuel delivery line, for instance.

It would therefore be desirable to perform a safe turbine startup procedure without the need for a flowmeter.

SUMMARY

According to one aspect, a method for safe gas turbine startup is disclosed. In some embodiments, the method comprises the following steps:

performing a leakage test of a fuel metering valve positioned along a fuel delivery line fluidly coupled with a combustor section of the gas turbine engine;

when the leakage test is successfully passed, initiating a gas turbine engine startup procedure.

By performing a leakage test on the fuel metering valve, a flowmeter can be dispensed with, since it is no more required to measure the actual fuel flow during startup of the gas turbine engine.

According to embodiments disclosed herein, the step of performing the leakage test of the fuel metering valve can comprise the following steps. Firstly a first test pressure is established in a closed volume upstream of the fuel metering valve, while the fuel metering valve is closed. The closed volume can be a section or portion of the fuel delivery line, for instance a section of the fuel delivery line between a shut off valve and the fuel metering valve. Once the test pressure has been established, a pressure drop upstream of the fuel metering valve can be detected. If the pressure drop is above a threshold value, a leakage alert signal can be triggered. If, conversely, the pressure drop is below the threshold value, a next step of the startup procedure can be performed.

The further step of the startup procedure can be any step required to initiate operation of the gas turbine engine, e.g. fuel delivery towards the combustor section and igniting of the air/fuel mixture.

The pressure drop can be measured as a pressure variation (reduction) during time. According to some embodiments, a measuring time interval can be set, during which the pressure is measured. The leakage test is passed if the pressure drop during the measuring time interval is within a given threshold. If the pressure drops more than the threshold value, the leakage test is failed.

According to some embodiments, the step of establishing the first test pressure in turn comprises the steps of: establishing a full fuel supply pressure in at least a portion of the closed volume upstream of the fuel metering valve; wherein the full fuel supply pressure is higher than the first test pressure; reducing the pressure from the full fuel supply pressure to said first test pressure. The full fuel supply pressure can be established by placing a section of the fuel delivery line into fluid communication with the fuel source through a shut off valve. The pressure can then be reduced through a vent valve or a flare valve.

According to some embodiments, the method can further comprise a full-stroke test step of the fuel metering valve. A full-stroke test as understood herein can be a test wherein the fuel metering valve is gradually brought from a closed position to a fully open position and subsequently again in the fully closed position. Opening and closing of the valve can be performed under controlled conditions, e.g. with a 5% stroke movement per pre-set time interval.

According to some embodiments, the method can further comprise a step of leak checking of at least one or more shut off valves arranged along the fuel delivery line.

Once the leakage test(s) have been performed, gas turbine engine startup can be executed. The startup procedure or routine can include the following steps:

delivery metered amount of fuel through the fuel metering valve to the combustor section of the gas turbine engine;

ignite a fuel/air mixture in the combustor section of the gas turbine engine.

According to embodiments disclosed herein, during the step of initiating the gas turbine engine startup, functionality of the fuel metering valve can be monitored and, if a functionality failure is detected, turbine startup can be aborted.

For instance, during the step of initiating the gas turbine engine startup, a fuel metering valve position feedback signal is acquired; and if the feedback signal is above a feedback signal threshold, startup is aborted.

In some embodiments, during the step of initiating the gas turbine engine startup, a mismatch between a control signal and a feedback signal of the fuel metering valve can be detected and, if said mismatch is above a mismatch threshold, startup is aborted.

Further monitoring steps to ensure safe startup of the gas turbine engine can be envisaged. According to some embodiments, the pressure in the fuel delivery line upstream of the fuel metering valve is monitored and, if said pressure exceeds a maximum pressure threshold startup is aborted.

According to another aspect, a gas turbine engine is disclosed, comprising: an air compression section; a combustor section; a turbine section; a fuel supply system comprised of a fuel delivery line and a valve arrangement positioned along said fuel delivery line. The valve arrangement can further comprise: sequentially arranged shut off valves; a fuel metering valve, positioned downstream of the shut off valves; a pressure measuring arrangement adapted to measure fuel pressure in at least one portion of the fuel delivery line upstream of the fuel metering valve.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
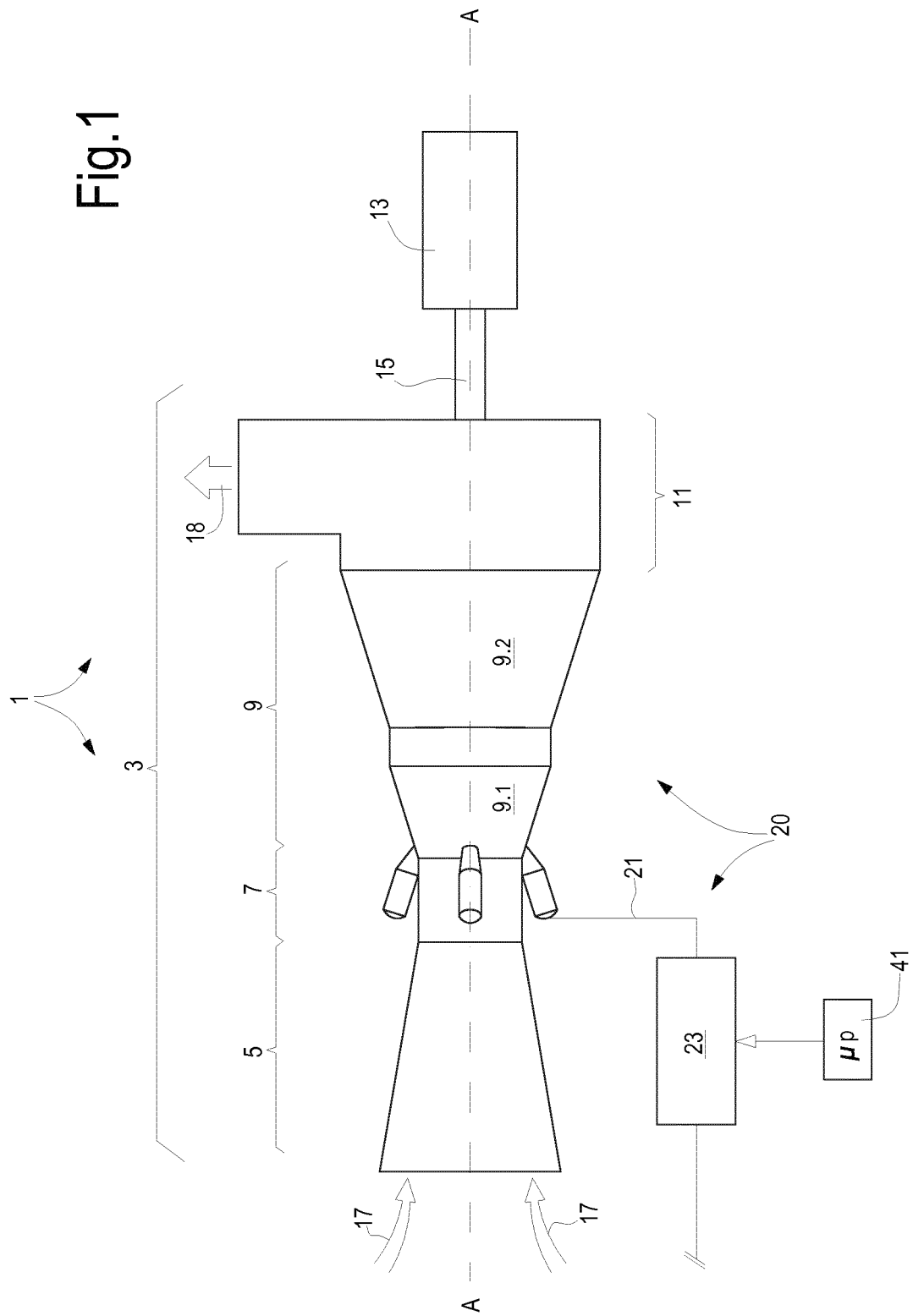
FIG. 1 is a schematic illustration of an exemplary gas turbine engine and load system.
Figure 2:
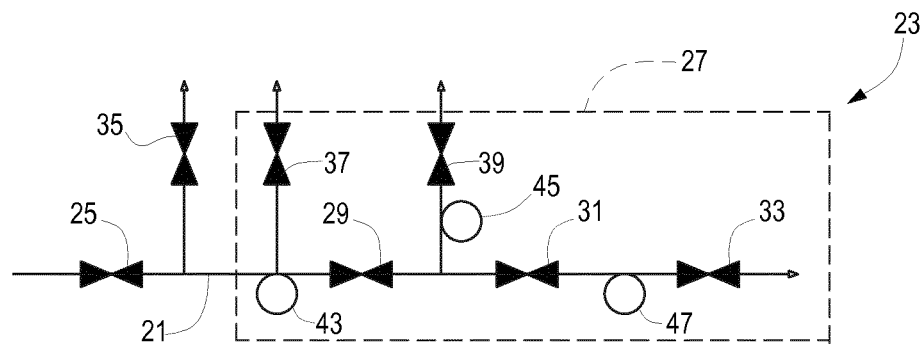
FIG. 2 is a schematic illustration of a fuel valve arrangement.

FIG. 1 is a schematic illustration of an exemplary gas turbine engine system 1. In the exemplary embodiment, gas turbine engine system 1 includes a gas turbine engine 3 that includes an air compression section 5, a combustor section 7, a turbine section 9 and an exhaust section 11. The gas turbine engine 3 can be drivingly coupled to a load 13 through a shaft line 15. The load 13 can comprise one or more driven rotary machines, such as compressors, pumps or electric generators.

The gas turbine engine 3 can be an aeroderivative gas turbine engine. In some embodiments, the gas turbine engine 3 can be an LM2500 gas turbine engine or a PGT25 gas turbine engine, available from Nuovo Pignone S.p.A., Florence, Italy.

The air compression section 5 can include one or more compressors. In the embodiment of FIG. 1 the air compression section comprises a single multi-stage axial compressor, but in other embodiments the air compression section 5 may comprise two or more compressors in sequence.

The turbine section 9 can comprise one or more turbines or turbine wheels. In the embodiment of FIG. 1, the turbine section 9 comprises a high-pressure turbine 9.1 and a power turbine, also referred to as low-pressure turbine 9.2, positioned downstream the high-pressure turbine 9.1. In the context of the present description, the terms upstream and downstream are referred to the direction of flow of the relevant fluid medium, unless differently specified.

The high-pressure turbine 9.1 can be drivingly coupled to the compressor of the air compression section 5. In this embodiment, the air compression section 5, the combustor section 7 and the high-pressure turbine 9.1 in combination form the gas generator of the gas turbine engine 3. Mechanical power generated by the combustion gas expansion in the high-pressure turbine 9.1 is used to drive the air compression section 5.

The power turbine 9.2 can be drivingly coupled to the shaft line 15 and mechanically separated from the high-pressure turbine 9.1. With this arrangement, mechanical power generated by the low-pressure turbine 9.2 is made available on the shaft line 15 to drive the load.

Other gas turbine arrangements are possible, with a different arrangement of compressors and turbines, as known to those skilled in the art.

In operation, a flow of intake air 17 is channeled through the air compression section 5. The compressed air is discharged from the air compression section 5 and channeled towards combustor section 7, where the compressed air is mixed with fuel and combusted to form a flow of high-pressure, hot combusted gas discharged towards high-pressure turbine 9.1. The flow of combusted gas discharged from combustor section 7 is sequentially expanded in high-pressure turbine 9.1 and low-pressure turbine 9.2. The enthalpy drop generates mechanical power to drive the air compression section 5 and the load 13. The flow of expanded combusted gas is then discharged from gas turbine engine 3 in the form of a flow of exhaust gas 18.

The gas turbine engine 3 can be fueled with a gaseous fuel. The gas turbine engine 3 is provided with a fuel supply system 20, which can include a single or multiple fuel delivery line 21 and a valve arrangement labeled 23 as a whole, arranged along the fuel delivery line 21 between the combustor section 7 and a fuel source (not shown). The valve arrangement 23 will be described in greater detail here below.

According to some embodiments the valve arrangement 23 comprises (see FIGS. 2 to 10) a first shut off valve, a second shut off valve and possibly a third shut off valve arranged in sequence in an upstream-downstream direction along the fuel delivery line 21. In some embodiments, the first shut off valve can be an external shutoff valve 25, which is positioned outside an enclosure 27 of the gas turbine engine 3. The second shut off valve can be a first internal shut off valve 29 and the third shut off valve can be a second internal shut off valve 31. Shut off valves 29, 31 are called "internal", as they are arranged inside the enclosure 27 of the gas turbine engine 3, while the first shut off valve 25 is referred to as an "external" shut off valve, since it is arranged outside the enclosure of the gas turbine engine 3.

Downstream from the second shut off valve 31, along the fuel delivery line 21 one or more fuel metering valves can be arranged. In the schematic of FIGS. 2 to 10 only one fuel metering valve 33 is shown. If several fuel metering valves are provided, they can be arranged in parallel. Valves 25, 29, 31, 33 are arranged in sequence in an upstream-downstream direction along the fuel delivery line 21. A "fuel metering valve" as used herein may be understood as any valve having a fuel metering control capability, i.e. which can be acted upon to control the fuel delivery towards the combustor section of the gas turbine engine.

The volume between the external shut off valve 25 and the first internal shut off valve 29 can be put in communication with the atmosphere through an external vent valve 35, while a flare valve 37 is further provided to selectively couple the volume between the external shut off valve 25 and the first internal shut off valve 29 to a flare or any other fuel gas recovery device. The flare valve 37 can be a warm-up valve of the gas turbine engine 3.

An internal vent valve 39 is arranged for selectively connecting a volume between the first internal shut off valve 29 and the second internal shut off valve 31 to the atmosphere.

The valve arrangement 23 can be further provided with pressure transmitters. As understood herein a pressure transmitter can be any device, instrument, component or arrangement, capable of detecting a pressure of a fluid in a closed volume, such as a duct or pipe, and transmitting a signal containing information on the detected pressure to a controller 41, for instance (see FIG. 1). As such a pressure transmitter can be or can include a pressure probe or a pressure transducer, suitable to detect a fluid pressure and to provide a signal, which includes information on the value of said fluid pressure, e.g. for further processing by a control units. A pressure measuring arrangement is positioned along the fuel delivery line 21 and combined with the valve arrangement 23. In some embodiments, the pressure measuring arrangement comprises a first pressure transmitter 43 arranged and adapted to detect the pressure between the external shut off valve 25 and the first internal shut off valve 29. The pressure measuring arrangement can further comprise a second pressure transmitter 45 arranged and adapted to detect the pressure between the first internal shut off valve 29 and the second internal shut off valve 31. The pressure measuring arrangement can additionally include a third pressure transmitter 47 arranged and adapted to detect the pressure between the second internal shut off valve 31 and the fuel metering valve(s) 33.

The valve arrangement 23 described so far can be tested prior to startup of the gas turbine engine 3, e.g. in order to check if the fuel metering valve(s) 33 are operating correctly and/or if leakages occur, for instance. Moreover, proper operation of some of the remaining valves of the valve arrangement 23 can also be checked, as described in detail here below.

The test is performed prior to startup of the gas turbine engine 3 and steps of the test will now be described reference being made to the sequence of FIGS. 3, 4, 5, 6, 7, 8, 9 and 10.

Prior to start the actual leakage test, a full stroke test can be performed on the fuel metering valve(s) 33 to check their functionality. A full opening and subsequent full closing command, e.g. with a 5% stroke per second, can be applied to the actuator of the fuel metering valve(s) 33 and actual opening and closing of the fuel metering valve(s) 33 are checked. If a mismatch higher than a threshold between the control signal and the actual position of the metering valve(s) 33 is detected, the gas turbine engine firing sequence shall be aborted and the gas turbine engine 3 shall be shut down.

Once the full stroke test of the fuel metering valve(s) has been successfully completed, the leakage test can start.

In the following description, a test sequence is described, wherein a leakage test on the fuel metering valve 33 is performed first, followed by leakage tests of valves 29 and 31. As will be clear later on, the leakage tests on valves 29 and 31 can be performed first, followed by a leakage test on the fuel metering valve 33.

In general terms and in a nutshell, the leakage test on fuel metering valve 33 is performed by pressurizing the piping upstream of the fuel metering valve 33 with fuel at a pressure which is below the operating pressure, i.e. below the fuel pressure under normal operating conditions. For instance, if the fuel gas pressure during normal operation of the gas turbine is around 30-45 barA (absolute bar), the test pressure can be slightly above 1 bar, e.g. 1.2-1-5 bar A. Once the test pressure has been established and stabilized in the piping upstream the fuel metering valve 33, for instance between the external shut off valve 25 and the fuel metering valve valve 33, the valves are closed, and the pressure is detected for instance by the third pressure transmitter 47. The leakage test of the fuel metering valve 33 is passed if after a given time interval, the pressure measured by the third pressure transmitter 47 is above a pre-determined threshold. If, during the test, the second internal shut off valve 31 is open, pressure can be detected by the second pressure transmitter 45.

A more detailed description of a possible test sequence will be provided here on. It shall be noted that the leakage test is performed under safety conditions, since in case of fuel leakage through the fuel metering valve 33, such leakage towards the gas turbine would occur under reduced pressure (test pressure). The fuel/air mixture leading into the gas turbine would have a fuel concentration below the Lower Flammability Limit (LFL).

Figure 3:
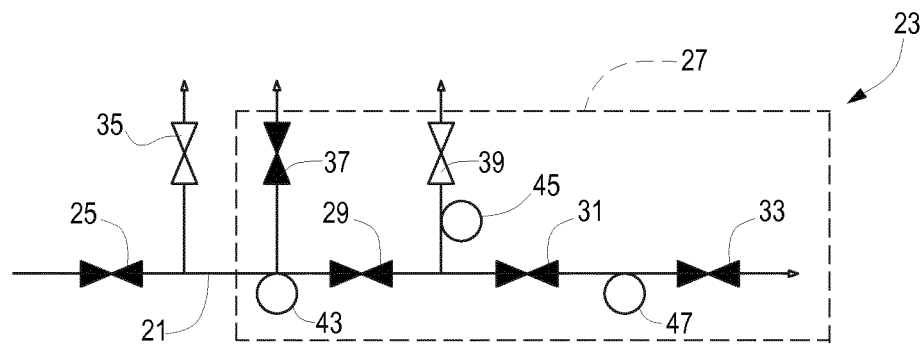
FIGS. 3, 4, 5, 6, 7, 8, 9 and 10 illustrate a sequence of operation for valve leakage tests at turbine startup.

According to some embodiments, the starting step of a possible sequence is shown in FIG. 3. The valves of valve arrangement 23 are de-energized. The following valves are closed: the external shut off valve 25, the first internal shut off valve 29, the second internal shut off valve 31, the fuel metering valve(s) 33, the flare or warm-up valve 37. The following valves are open: external vent valve 35; internal vent valve 39. In this stage the volume inside the ducts extending from the external shut off valve 25 and the second internal vent shut off valve 31 is at ambient pressure, i.e. around 1 barA.

In FIGS. 3, 4, 5, 6, 7, 8, 9 and 10, which illustrate sequential steps of the startup test, closed valves are shown in black, and open valves are represented in white.

Figure 4:
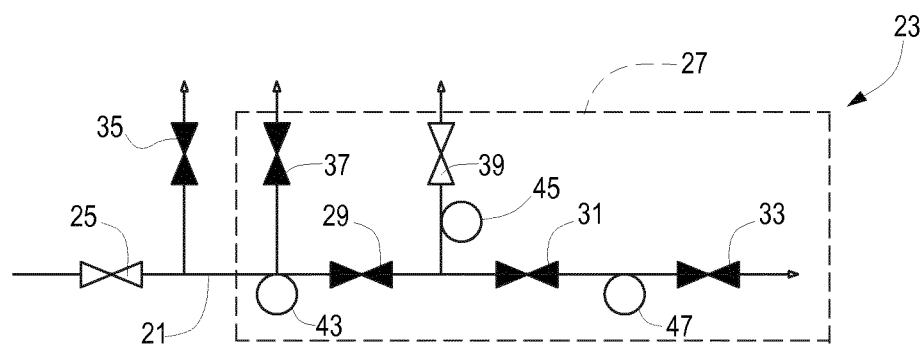

The next step is represented in FIG. 4. The external shut off valve 25 is opened and the external vent valve 35 is closed. The remaining valves are maintained in the same condition as shown in FIG. 3. The inner volume of the fuel delivery line 21 up to the first internal shut off valve 29 is thus filled with fuel gas at full line pressure, i.e. full fuel supply pressure. The pressure transmitter 43 can check whether the full line pressure has been achieved. The full fuel supply pressure can be around 30-45 barA.

Figure 5:
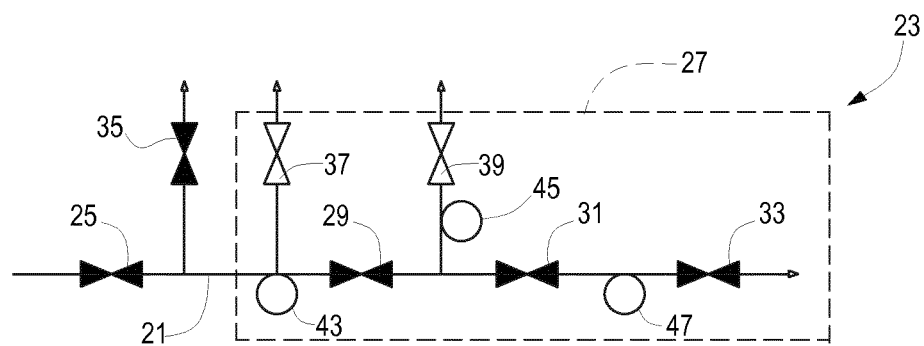

Once the pressure upstream of the first internal shut off valve 29 is stable, the warm up or flare valve 37 can be opened, and the external shut off valve 25 can be closed, as shown in FIG. 5. Due to fuel gas venting through the flare valve 37, the pressure in the volume between the external shut off valve 25 and the first internal shut off valve 29 drops. This step is provided to achieve a test pressure in said volume, which can be lower than the full fuel supply pressure. For instance, if the full fuel supply pressure is around 45 barA, the test pressure can be around 1.4 barA.

The first pressure transmitter 43 can detect the pressure in the volume between the external shut off valve 25 and the first internal shut off valve 29. The controller 41 can start the closing stroke of the flare valve 37 when the first pressure transmitter 43 detects a pressure which is slightly higher than the test pressure, taking into consideration the time required to close the flare valve 37 and the pressure reduction rate. For instance, if the test pressure is set at 1.4 barA, the flare valve 37 can start closing when the first pressure transmitter detects a pressure of around 1.5 barA.

It shall be understood that all pressure values set forth herein are by way of example only and shall not be construed as limiting the scope of the present disclosure. The test pressure, as well as any other exemplary pressure value set forth herein can vary depending upon the design of the system, e.g. depending upon the type of gas turbine engine used, the piping arrangement, and so on.

Figure 6:
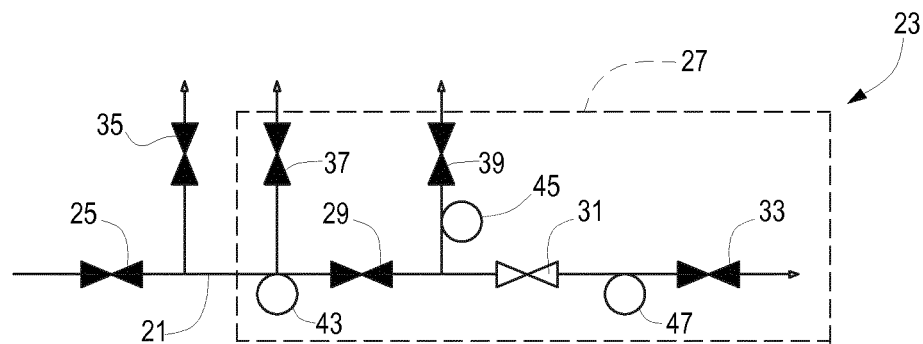

The next step, depicted in FIG. 6, is aimed at filling the piping volume between the external shut off valve 25 and the fuel metering valve(s) 33 at the same pressure. The first internal shut off valve 29 and the second shut off valve 31 are opened, while the remaining valves are closed. Once the pressure becomes stable, the first, second and third pressure transmitters 43, 45, 47 shall read the same pressure value. This pressure value is approximately the test pressure, since the volume of the piping between the first internal shut off valve 29 and the fuel metering valve(s) 33 is much smaller than the volume of the piping between the external shut off valve 25 and the first internal shut off valve 29.

Once the three pressure transmitters 43, 45, 47 read the same pressure, the first internal shut off valve 29 can be closed (see FIG. 6) and the fuel metering valve leakage test can start. If fuel leaks through the fuel metering valve(s) 33, the pressure detected by the three pressure transmitters 43, 45, 47 will drop. If the pressure read by the pressure transmitters 43, 45, 47 drops below a minimum pressure threshold Pth within a given test time interval $\Delta t$, an alarm is generated, indicating that the fuel metering valve(s) 33 are leaking, the gas turbine engine startup will be inhibited and the engine will be shutdown. For instance, if the test pressure is set at around 1.4 barA, the minimum pressure threshold Pth can be set at Pth=1.31 barA and the test time interval $\Delta t$ can be set at 10 seconds.

If, once the test time interval $\Delta t$ has lapsed, the pressure detected by the pressure transmitters 43, 45, 47 is at or above the minimum pressure threshold Pth, the fuel metering valve leakage test is considered positively passed. If, conversely, the pressure has dropped below the minimum pressure threshold Pth, the fuel metering valve(s) 33 have failed the leakage test, the startup procedure shall abort.

If the fuel metering valve leakage test has been successful, in some embodiments of the method disclosed herein further test steps can be provided, to check the functionality of other components of valve arrangement 23.

For instance, a leakage test of the first internal shut off valve 29 and/or a leakage test of the second internal shut off valve 31 can be performed.

In brief, the leakage test of the first internal shut off valve 29 can be performed as follows. The piping upstream the first internal shut off valve 29 is pressurized and the piping downstream the first internal shut off valve 29 is depressurized entirely, e.g. at ambient pressure. All valves can then be closed. The second pressure transmitter 45 detects the pressure value for a given time interval. If after said test time interval the pressure detected by the second pressure transmitter 45 is below a given threshold, the leakage test for the first internal shut off valve 29 is successfully passed.

The test is statistically safe, since the possibility for a fuel/air mixture with a fuel concentration above LFL to be formed is below a threshold set by the law.

In brief a leakage test for the second the second internal shut off valve 31 can be performed as follows. The piping between the first and second internal shut off valves 29 and 31 is set at a given value. If this test is performed after the leakage test for the first internal shut off valve 29, pressurization of the piping between the first and the second shut off valves 29 and 31 can be obtained by opening the first internal shut off valve 29, the second shut off valve 31 remaining closed, to obtain the same pressure value upstream and downstream of the first shut off valve 29, detected by the first pressure transmitter 43 and second pressure transmitter 45. The pressure downstream the second internal shut off valve 31 is at ambient pressure, since the piping section between valves 31 and 33 was brought at ambient pressure in the previous step and the previous leakage test has been passed successfully.

The leakage test for the second internal shut off valve 31 is successfully passed if the pressure detected by the second pressure transmitter 45 decreases by a limited amount, i.e. if the pressure detected by the second pressure transmitter 45 after a given test time interval is above a test threshold. The test is performed under intrinsically safe conditions, since in case of leakage the fuel/air mixture delivered to the gas turbine would be anyhow below the LFL.

The following description concerns possible embodiments of the leakage tests for the first and second internal shut off valves 29, 31 summarized above.

Figure 7:
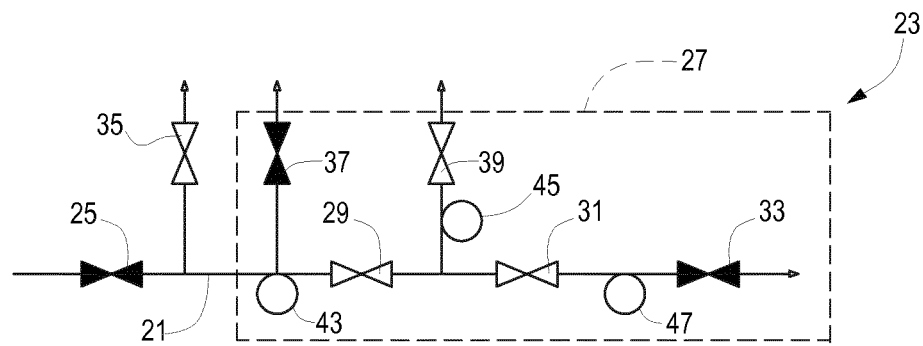

Starting from the successful conclusion of the fuel metering valve leakage test described above, the next step may require venting of the fuel delivery line. This may be performed e.g. by opening the external vent valve 35, or the internal vent valve 39, or both, to obtain faster venting, as schematically represented in FIG. 7. The first internal shut off valve 29 and the second internal shut off valve 31 are maintained open, while the external shut off valve 25 and the fuel metering valve(s) 33 are maintained closed.

The volume between the external shut off valve 25 and the fuel metering valves 33 can be depressurized to a minimum pressure, for instance 1.25 barA.

Figure 8:
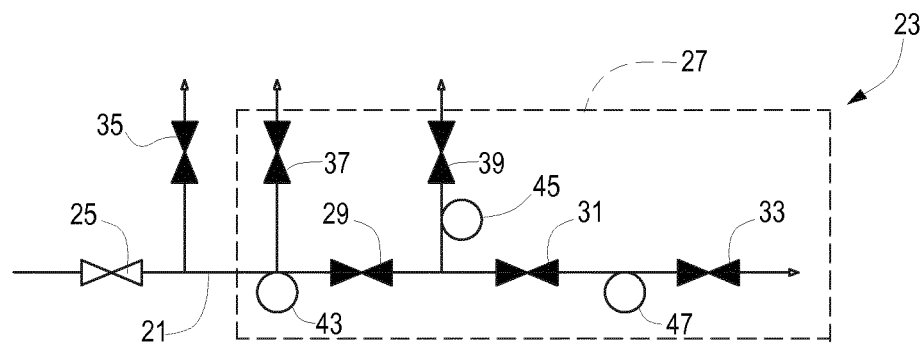

Next, see FIG. 8, the first internal shut off valve 29, the second internal shut off valve 31 are closed, and the external vent valve 35 and the internal vent valve 39 are closed again. Thereafter, the external shut off valve 25 can be opened again, thus pressurizing the fuel delivery line 21 up to the first internal shut off valve 29 at full fuel supply pressure. Leakages through the first internal shut off valve 29 can be detected. For this purpose the second pressure transmitter 45 can be used. If leakage across the first internal shut off valve 29 is present, the pressure between the first internal shut off valve 29 and the second shut off valve 31 increases. Pressure variations can be detected by the second pressure transmitter 45.

In some embodiments a first maximum pressure threshold value Pth1 and a test time interval Δt1 can be set for testing the first internal shut off valve 29. For instance Pth1 can be set at 20 barA and Δt1 can be set at 30 seconds. If the pressure detected by the second pressure transmitter 45 at the end of the test time interval Δt1 is at or above the first maximum pressure threshold Pth1 the turbine startup will be inhibited and the gas turbine engine will be shut down.

Figure 9:
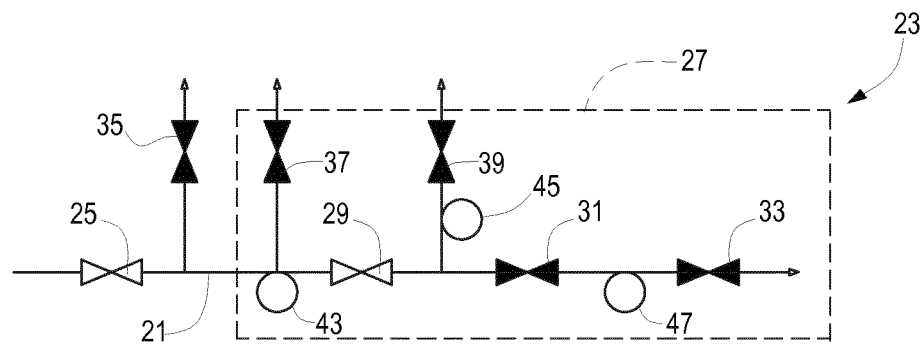
Figure 10:
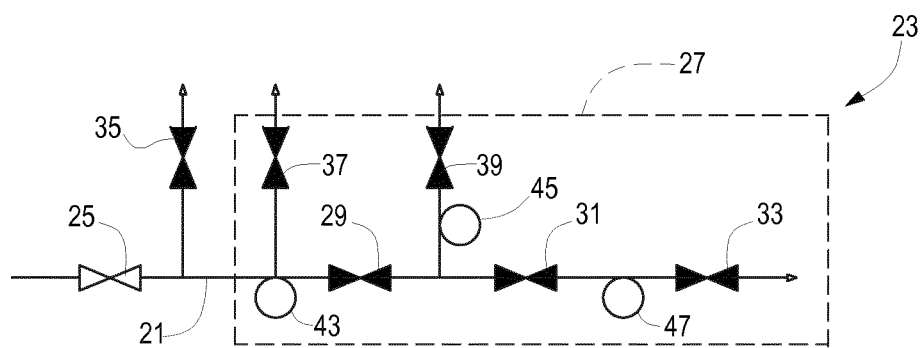

If, conversely, the pressure detected by the second pressure transmitter 45 at the end of the test time interval Δt1 is below the first maximum pressure threshold value Pth1, the leakage test of the first internal shut off valve 29 is successfully passed, and the second internal shut off valve 31 can be tested for leakages as follows. This test is depicted in the steps of FIGS. 9 and 10. In FIG. 9 the valves are in the same positions as in FIG. 8, except that the first internal shut off valve 29 has been fully opened, to pressurize the fuel delivery line 21 up to the second internal shut off valve 31 to full fuel supply pressure. Once the volume between the first internal shut off valve 29 and the second internal shut off valve 31 has been brought at full fuel supply pressure, the first internal shut off valve 29 can be closed, as shown in FIG. 10. The pressure in the volume between the first internal shut off valve 29 and the second internal shut off valve 31 is monitored by the second pressure transmitter 45. A minimum pressure threshold Pth2 and a further test time interval Δth2 are set for this test step. For instance Pth2 is set at 15 barA and Δth2 can be set again at 30 seconds.

If after Δth2 the pressure detected by the second pressure transmitter 45 is at or above Pth2, the test is successfully passed. Otherwise, the turbine start-up will be inhibited and the gas turbine is shut down. The excessive pressure drop can be due to leakages of the internal vent valve 39 and/or of the second internal shut off valve 31.

Alarm signals can be generated when any one of the above described leakage tests fails.

Once the leakage test of the second internal shut off valve 31 and of the internal vent valve 39 has successfully passed, the gas turbine engine 3 can be started.

The test for leakages of the first and second internal shut off valves 29, 31 and for the internal vent valve 39 can be performed also when the gas turbine engine 3 is shut off after a period of operation.

The above described test steps make it possible to check the functionality of the fuel metering valve(s) 33 and to determine whether an excessive fuel gas leakage occurs there through. If this test is successfully passed, a gas turbine startup routine can be started, without the need for a flowmeter to check the actual fuel flow across the fuel metering valve. The disadvantages of the flow meters are avoided and at the same time malfunctioning of the gas turbine engine due to flaws in the fuel metering valve(s) is prevented.

Figure 11A:
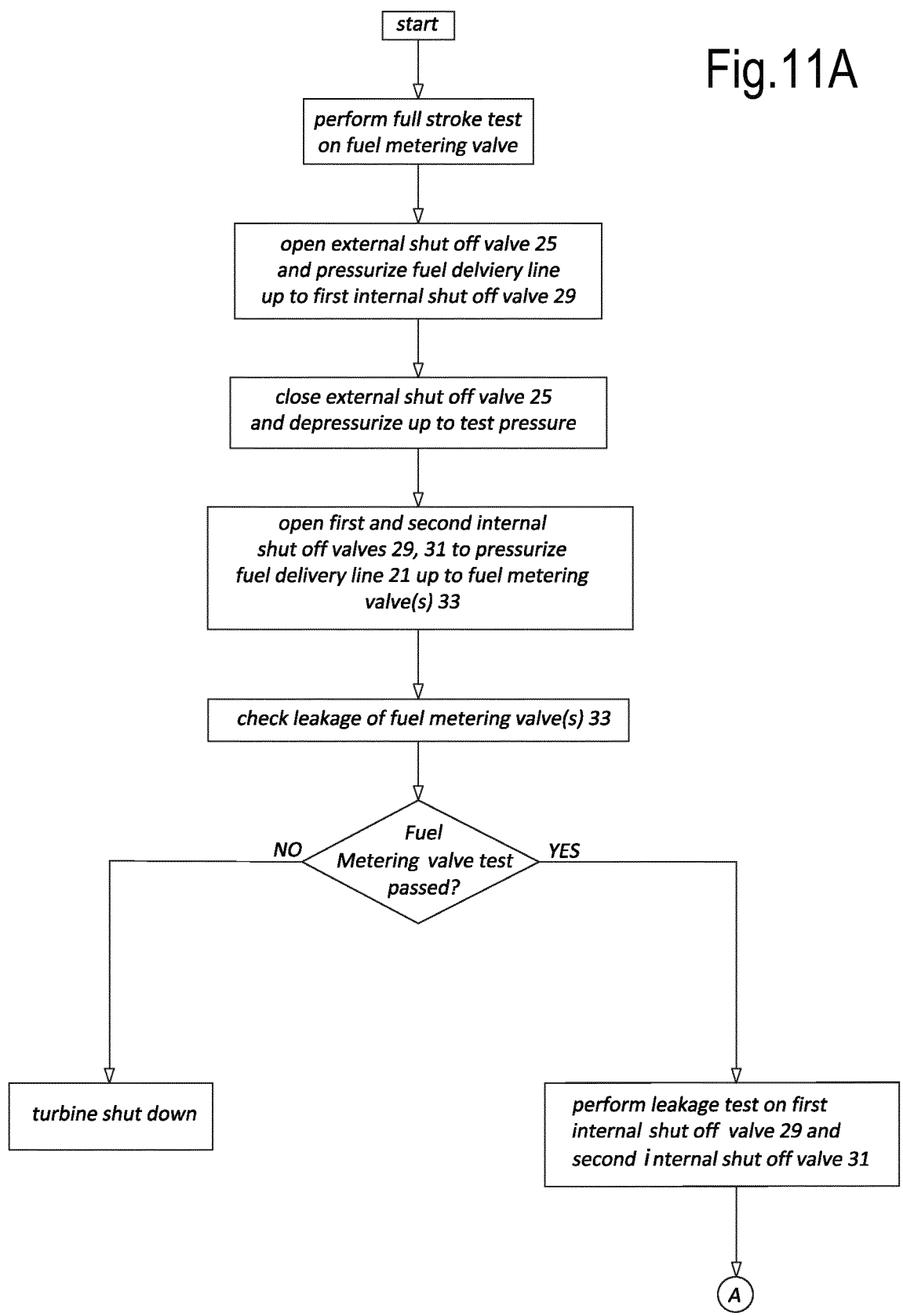
FIGS. 11A, 11B and 12 illustrate flow charts of the method for valve testing and gas turbine startup disclosed herein.
Figure 11B:
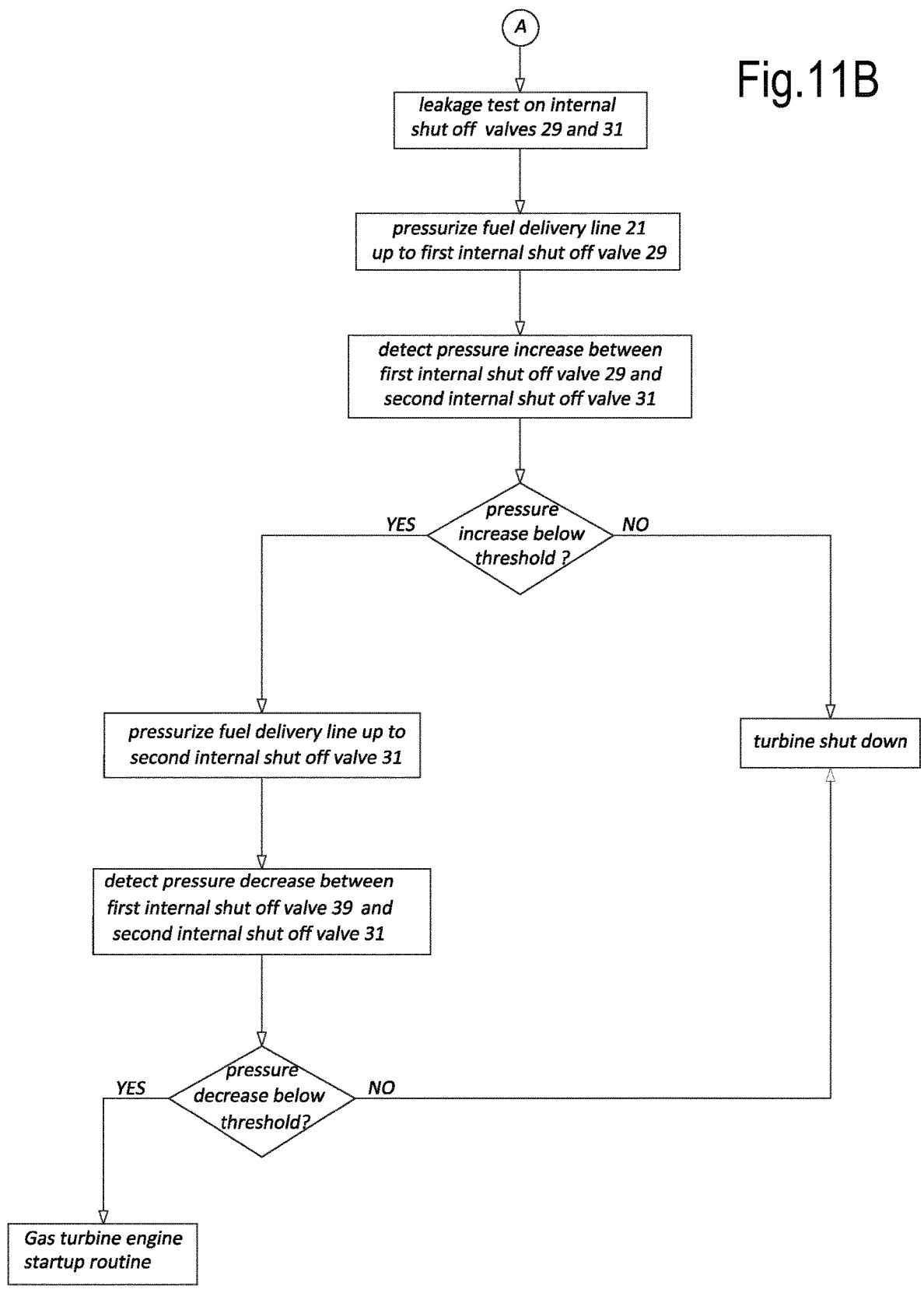

The above described method is summarized in the flow chart of FIGS. 11A, 11B.

While in the above described test sequence the leakage test of the first and second internal shut off valves 29 and 31 is performed after the leakage test for the fuel metering valve 33, in other embodiments the procedure can be reversed: the shut off valves 29 and 31 are tested for possible leakages first and the fuel metering valve leakage test can follow. Also, while in the above described test sequence the full stroke test is performed at the beginning of the test procedure, in other embodiments the full stroke test can be performed after execution of one, some or all the leakage tests.

According to some embodiments, the full-stroke test and the valve leakage test described above can be part of a safe gas turbine engine startup procedure, including additional steps, which will be described here below.

Once the full stroke test and the valve leakage test have been successfully passed as described above and as shown in FIGS. 11A, 11B, a gas turbine engine startup or firing procedure can start. The first internal shut off valve 29 and the second internal shutoff valve 31 can be opened, such that full fuel pressure is established upstream from the fuel metering valve 33.

The fuel metering valve 33 can then be opened. The opening stroke can be set according to known methods, not described, depending upon the requested fuel flow rate.

Next, sparking is started to ignite the air-fuel mixture in the combustor section 7 of the gas turbine engine 3. The firing sequence ends when flame is detected in the combustor chamber(s) and/or once a pre-set sparking time is lapsed.

Figure 12:
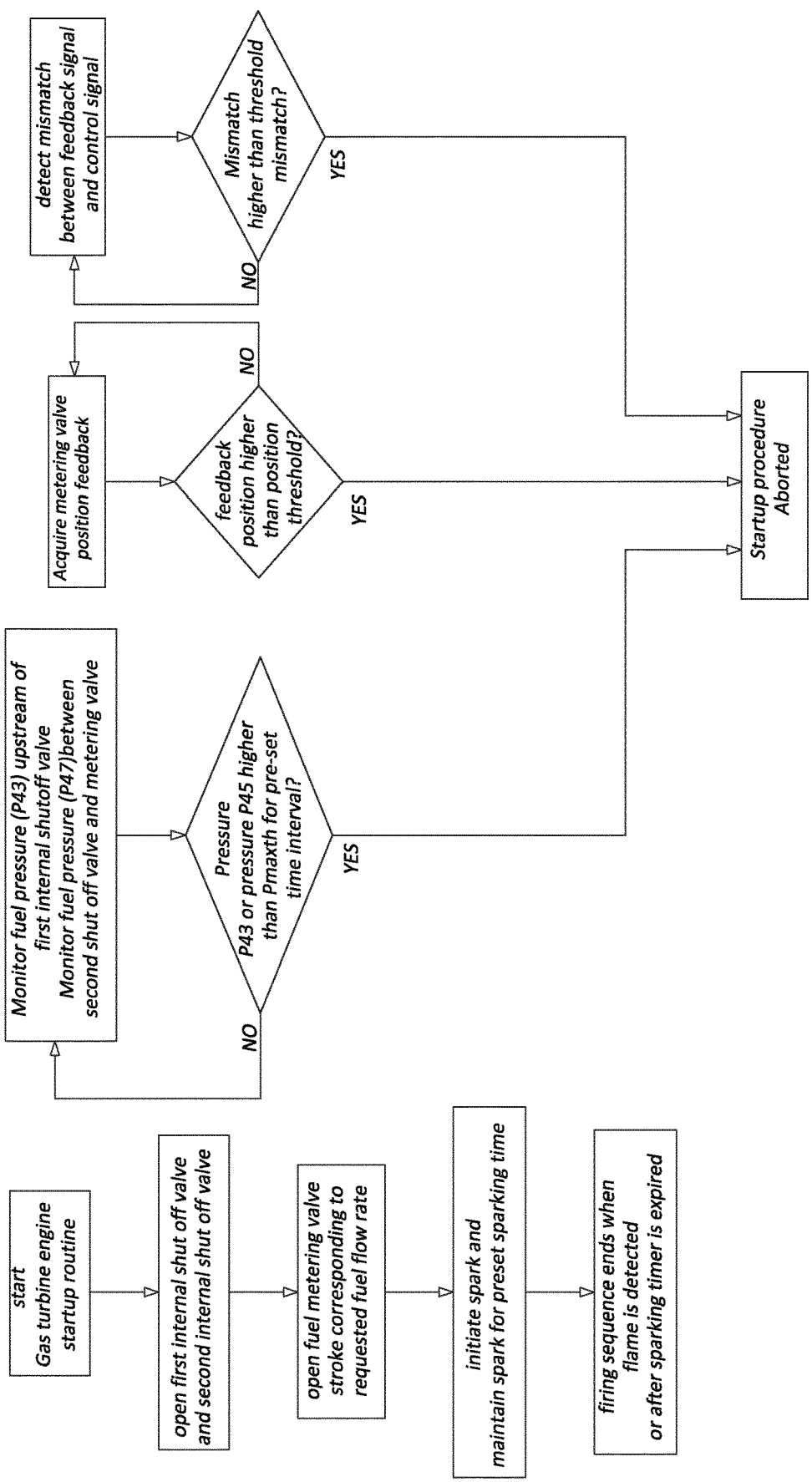

For safe turbine startup, during the above summarized startup procedure operating parameters can be continuously or periodically detected and checked. As shown in FIG. 12, the fuel pressure P43 upstream from the first internal shut off valve 29 and the fuel pressure P47 upstream from the fuel metering valve 33 can be detected by the pressure transmitters 43 and 47, respectively and transmitted to a control unit.

If either P43 or P47 are above a maximum pressure threshold Pmaxth for a pre-set time interval, the startup procedure is aborted.

Correct operation of the fuel metering valve 33 is also checked during startup. A valve position feedback can be detected. If the feedback signal is higher than a threshold value, the startup procedure is aborted. Similarly, the valve position feedback signal and the control signal are compared. If the mismatch between the two signals is above a mismatch threshold, the startup procedure is aborted.

These two checks on the fuel metering valve 33 are aimed at detecting possible mechanical failure of the fuel metering valve 33 and at stopping startup should the fuel metering valve 33 not operate correctly.

Figure 13:
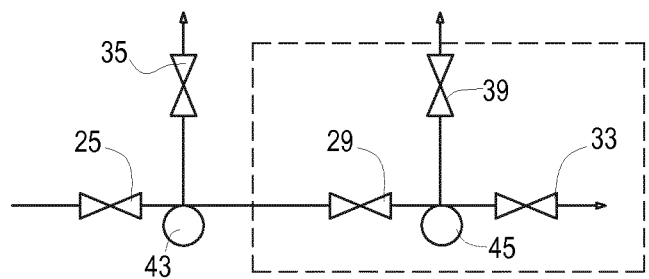
FIG. 13 illustrates a further embodiment of a fuel valve arrangement.

In further, currently less preferred embodiments, a different number of valves can be provided in the valve arrangement 23. FIG. 13 illustrates a simplified schematic of a valve arrangement 23 with a reduced number of shut off valves. The same reference numbers designate the same or similar components as already described with respect to FIGS. 2-10. In the schematic of FIG. 13 a single internal shut off valve 29 is provided, upstream from the fuel metering valve(s) 33. A first pressure transmitter 43 and a second pressure transmitter 45 are provided, as well as an external vent valve 35 and an internal vent valve 39.

In a first step, leakage of the fuel metering valve(s) 33 can be checked by establishing a reduced fuel pressure inside the volume contained between the first internal shut off valve 29 and the fuel metering valves 33, in a way similar to the one described above in connection with FIGS. 3, 4 and 5. Once the reduced pressure has been established and is stabilized, keeping the external shut off valve 25, the internal vent valve 39 and the fuel metering valve(s) 33 closed, pressure drop in the volume between the fuel metering valve(s) 33 and the external shut off valve 25 is detected. If the pressure drop is too fast, e.g. if the pressure drops below Pth in a test time period Δt as defined above, a fuel metering valve leakage alarm is triggered and the gas turbine engine is shut down.

The leakage test of the internal shut off valve 29 and of the internal vent valve 39 can be performed in a manner similar to what has been described above in connection with FIGS. 7, 8, 9 and 10, except that a single internal shut off valve has to be checked for leakages, rather than two. Thus, in a first step the line downstream from the external shut off valve 25 can be vented (as in FIG. 7) and the internal shut off valve 29 can be closed. The volume upstream of the shut off valve 29 is then pressurized at full fuel supply pressure by opening the external shut off valve 25. The second pressure transmitter 45 will then detect the pressure increase between the closed internal shut off valve 29 and the fuel metering valve(s) 33. A maximum pressure threshold Pth3 and a test time interval Δt3 are set, for instance 30 barA and 30 seconds, respectively. If the pressure increase detected by the second pressure transmitter 45 after 30 seconds is above 30 barA, then a shut off valve leakage alarm is triggered and the gas turbine engine 3 is shut down.

If both leakage tests are successfully passed, the gas turbine engine can proceed to start up.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A method for safe gas turbine startup, comprising the following steps:
    performing a leakage test of a fuel metering valve positioned along a fuel delivery line and fluidly coupled with a combustor section of the gas turbine engine, wherein the step of performing the leakage test of the fuel metering valve further comprises the following steps:
        establishing a first test pressure in a closed volume upstream of the fuel metering valve while the fuel metering valve is closed, wherein said first test pressure is lower than a full fuel supply pressure;
        detecting a pressure drop upstream of the fuel metering valve;
        if the pressure drop is above a threshold value, generating a leakage alert signal; and
        if the pressure drop is below the threshold value, executing a further step of the startup procedure,
    wherein the step of establishing the first test pressure comprises the steps of:
        establishing a full fuel supply pressure in at least a portion of the closed volume upstream of the fuel metering valve, wherein the full fuel supply pressure is higher than the first test pressure; and
        reducing the pressure from the full fuel supply pressure to said first test pressure,
    wherein the closed volume upstream of the fuel metering valve includes a portion of the fuel delivery line comprised between an external shut off valve and the fuel metering valve, at least a first internal shut off valve is arranged between the fuel metering valve and the external shut off valve, and at least a second internal shut off valve is arranged between the fuel metering valve and the first internal shut off valve;
    initiating a gas turbine engine startup procedure when the leakage test is successfully passed;
    pressurizing a volume between the external shut off valve and the first internal shut off valve at full fuel supply pressure;
    closing the external shut off valve, and reducing the pressure in the volume between the external shut off valve and the first internal shut off valve; and
    opening the first internal shut off valve and the second internal shut off valve to equalize pressure in the volume between the external shut off valve and the fuel metering valve at said first test pressure.

2. The method of claim 1, further comprising a full-stroke test step of the fuel metering valve.

3. The method of claim 2, wherein the full-stroke test step is performed prior to the leakage test of the fuel metering valve.

4. The method of claim 1, further comprising a step of leak checking of at least the first internal shut off valve arranged along the fuel delivery line.

5. The method of claim 1, wherein the step of initiating the gas turbine engine startup comprises the steps of:
    delivering metered amount of fuel through the fuel metering valve to the combustor section of the gas turbine engine;

igniting a fuel/air mixture in the combustor section of the gas turbine engine.

6. The method of claim 1, wherein during the step of initiating the gas turbine engine startup, functionality of the fuel metering valve is monitored and, if a functionality failure is detected, engine startup is aborted.

7. The method of claim 6, wherein during the step of initiating the gas turbine engine startup, a fuel metering valve position feedback signal is acquired; and wherein if the feedback signal is above a feedback signal threshold, startup is aborted.

8. The method of claim 6, wherein during the step of initiating the gas turbine engine startup, a mismatch between a control signal and a feedback signal of the fuel metering valve is detected and, if said mismatch is above a mismatch threshold, startup is aborted.

9. The method of claim 1, wherein during the step of initiating the gas turbine engine startup, pressure in the fuel delivery line upstream of the fuel metering valve is monitored and wherein, if said pressure exceeds a maximum pressure threshold (Pmaxth), startup is aborted.

10. A method for safe gas turbine startup, comprising the following steps:
performing a leakage test of a fuel metering valve positioned along a fuel delivery line and fluidly coupled with a combustor section of the gas turbine engine, wherein the step of performing the leakage test of the fuel metering valve further comprises the following steps:
establishing a first test pressure in a closed volume upstream of the fuel metering valve while the fuel metering valve is closed, wherein said first test pressure is lower than a full fuel supply pressure;
detecting a pressure drop upstream of the fuel metering valve;
if the pressure drop is above a threshold value, generating a leakage alert signal; and
if the pressure drop is below the threshold value, executing a further step of the startup procedure,
wherein the step of establishing the first test pressure comprises the steps of:
establishing a full fuel supply pressure in at least a portion of the closed volume upstream of the fuel metering valve, wherein the full fuel supply pressure is higher than the first test pressure; and
reducing the pressure from the full fuel supply pressure to said first test pressure,
wherein the closed volume upstream of the fuel metering valve includes a portion of the fuel delivery line comprised between an external shut off valve and the fuel metering valve, at least a first internal shut off valve is arranged between the fuel metering valve and the external shut off valve, and at least a second internal shut off valve is arranged between the fuel metering valve and the first internal shut off valve;
initiating a gas turbine engine startup procedure when the leakage test is successfully passed;
pressurizing the volume upstream of the first internal shut off valve;
while keeping the second internal shut off valve closed, detecting the pressure in the volume between the first internal shut off valve and the second internal shut off valve;
based on the pressure increase between the first internal shut off valve and the second internal shut off valve, determining whether the first internal shut off valve is leaking; and
generating the leakage alert signal if the first internal shut off valve is leaking.

11. The method of claim 10, further comprising the steps of:
closing the first internal shut off valve;
while the first internal shut off valve and the second internal shut off valve are closed, detecting a pressure variation between the first internal shut off valve and the second shut off valve;
based on the pressure decrease between the first internal shut off valve and the second internal shut off valve, determining whether the second internal shut off valve is leaking;
if the second internal shut off valve is leaking, generating the leakage alert signal.

12. A method for safe gas turbine startup, comprising the following steps:
performing a leakage test of a fuel metering valve positioned along a fuel delivery line and fluidly coupled with a combustor section of the gas turbine engine, wherein the step of performing the leakage test of the fuel metering valve further comprises the following steps:
establishing a first test pressure in a closed volume upstream of the fuel metering valve while the fuel metering valve is closed, wherein said first test pressure is lower than a full fuel supply pressure;
detecting a pressure drop upstream of the fuel metering valve;
if the pressure drop is above a threshold value, generating a leakage alert signal; and
if the pressure drop is below the threshold value, executing a further step of the startup procedure,
wherein the step of establishing the first test pressure comprises the steps of:
establishing a full fuel supply pressure in at least a portion of the closed volume upstream of the fuel metering valve, wherein the full fuel supply pressure is higher than the first test pressure; and
reducing the pressure from the full fuel supply pressure to said first test pressure,
wherein the closed volume upstream of the fuel metering valve includes a portion of the fuel delivery line comprised between an external shut off valve and the fuel metering valve, at least a first internal shut off valve is arranged between the fuel metering valve and the external shut off valve, and at least a second internal shut off valve is arranged between the fuel metering valve and the first internal shut off valve;
initiating a gas turbine engine startup procedure when the leakage test is successfully passed; and
performing a leakage test for the first internal shut off valve, wherein the leakage test for the first internal shut off valve comprises the steps of:
depressurizing a volume upstream and downstream the first internal shut off valve and the fuel metering valve;
closing the first internal shut off valve and the volume downstream thereof;
pressurizing at a test pressure the volume upstream the first internal shut off valve; and
detecting a pressure increase in the volume downstream of the first shut off valve,
wherein the leakage test for the first internal shut off valve is successfully passed if the pressure increase is below a test threshold.

13. The method of claim 12, further comprising a leakage test for the second internal shut off valve.

14. The method of claim 13, wherein the leakage test for the second internal shut off valve comprises the following steps, which are performed if the leakage test for the first shut off valve is successfully passed:
opening the first internal shut off valve and equalize the pressure upstream and downstream of the first internal shut off valve while the second shut off valve is maintained closed;
detecting the pressure upstream of the second shut off valve;
wherein the leakage test for the second internal shut off valve is successfully passed if the pressure decrease is below a test threshold.

15. The method of claim 12, further comprising:
pressurizing a volume between the external shut off valve and the first internal shut off valve at full fuel supply pressure; and
closing the external shut off valve and reducing the pressure in the volume between the external shut off valve and the first internal shut off valve.

16. The method of claim 15, further comprising the step of opening the first internal shut off valve to pressurize the volume between the external shut off valve and the fuel metering valve at said first test pressure.

17. A gas turbine engine, comprising:
an air compression section;
a combustor section;
a turbine section;
a fuel supply system comprised of a fuel delivery line and a valve arrangement positioned along said fuel delivery line adapted to deliver fuel to the combustor section;
the valve arrangement comprising a set of shut off valves including an external shut off valve, a first internal shut off valve, and a second internal shut off valve; a fuel metering valve positioned downstream of the shut off valves and adapted to deliver fuel to the combustor section; and a pressure measuring arrangement adapted to measure fuel pressure in at least one portion of the fuel delivery line upstream of the fuel metering valve,
wherein a closed volume is defined upstream of the fuel metering valve and includes a portion of the fuel delivery line between the external shut off valve and the fuel metering valve, the first internal shut off valve is arranged between the fuel metering valve and the external shut off valve, and the second internal shut off valve is arranged between the fuel metering valve and the first internal shut off valve.

18. The gas turbine engine of claim 17, wherein the valve arrangement and the pressure measuring arrangement are adapted to establish a test pressure within a section of the fuel delivery line upstream from the fuel metering valve, said test pressure being below a full fuel supply pressure, and to detect a pressure drop in said section while the fuel metering valve is closed.

19. The gas turbine engine of claim 17, wherein the valve arrangement further comprises a third shut off valve between the second shut off valve and the fuel metering valve.

20. The gas turbine engine of claim 19, wherein the pressure measuring arrangement comprises one or more of the following: a pressure transmitter between the first shut off valve and the second shut off valve; a pressure transmitter between the second shut off valve and the third shut off valve; a pressure transmitter between the third shut off valve and the fuel metering valve.

21. The gas turbine engine of claim 17, further comprising one or more vents to selectively vent sections of the fuel delivery line.

* * * * *